United States Patent
Ono et al.

(10) Patent No.: US 9,891,981 B2
(45) Date of Patent: Feb. 13, 2018

(54) INFORMATION PROCESSING APPARATUS AND SWITCH FAILURE DETECTION METHOD

(71) Applicant: FUJITSU LIMITED, Kawasaki-shi, Kanagawa (JP)

(72) Inventors: Takatsugu Ono, Kawasaki (JP); Mitsuru Sato, Paderborn (DE); Susumu Saga, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 14/577,505

(22) Filed: Dec. 19, 2014

(65) Prior Publication Data
US 2015/0106658 A1    Apr. 16, 2015

Related U.S. Application Data

(63) Continuation of application No. PCT/JP2012/066188, filed on Jun. 25, 2012.

(51) Int. Cl.
*G06F 11/00*    (2006.01)
*G06F 11/07*    (2006.01)
(Continued)

(52) U.S. Cl.
CPC ........ *G06F 11/079* (2013.01); *G06F 11/0721* (2013.01); *G06F 11/1608* (2013.01); *G06F 11/2033* (2013.01)

(58) Field of Classification Search
CPC .................................................. G06F 11/1608
(Continued)

(56) References Cited

U.S. PATENT DOCUMENTS 5,223,836 A * 6/1993 Komatsu ................. H03M 1/14
                                                              341/156
6,131,169 A * 10/2000 Okazawa ............ G06F 11/2007
                                                              370/217
(Continued)

FOREIGN PATENT DOCUMENTS

JP     2001-256203     9/2001
JP     2001-318901    11/2001
(Continued)

OTHER PUBLICATIONS

Shokodo Co. Ltd., "Parallel Computers", Information system schoolbook series 18th volume, p. 8p-9p, Jun. 5, 1996.
(Continued)

*Primary Examiner* — Elmira Mehrmanesh
(74) *Attorney, Agent, or Firm* — Staas & Halsey LLP

(57) ABSTRACT

An information processing apparatus includes a storage device, an arithmetic processing unit, a first converting device, and a second converting device. The storage device outputs data in accordance with a memory access request. The arithmetic processing unit performs an arithmetic operation on the data. The first converting device converts a memory access request issued by the arithmetic processing unit to a memory access signal and sends to the storage device. The second converting device converts a memory access request issued by the arithmetic processing unit to a memory access signal, acquires the memory access signal sent by the first converting device, and compares the content of a memory access performed by using the converted memory access signal with the content of a memory access performed by using the acquired memory access signal, and determines whether the first converting device has failed.

8 Claims, 11 Drawing Sheets

(51) Int. Cl.
*G06F 11/16* (2006.01)
*G06F 11/20* (2006.01)

(58) Field of Classification Search
USPC .................................................. 714/11, 43
See application file for complete search history.

(56) References Cited

U.S. PATENT DOCUMENTS

| | | | |
|---|---|---|---|
| 6,263,415 B1* | 7/2001 | Venkitakrishnan | .........................<br>G06F 15/17381<br>370/406 |
| 8,521,977 B2* | 8/2013 | Ueki | ................... G06F 12/1458<br>711/163 |
| 8,799,702 B2* | 8/2014 | Buckland | ............ G06F 13/4022<br>714/4.1 |
| 2001/0030942 A1 | 10/2001 | Suzuki | |
| 2002/0057712 A1* | 5/2002 | Moriwaki | ............. H04L 49/101<br>370/463 |
| 2003/0227920 A1 | 12/2003 | Benayoun et al. | |
| 2005/0223274 A1 | 10/2005 | Bernick et al. | |
| 2007/0255875 A1 | 11/2007 | Weiberle et al. | |
| 2008/0046629 A1 | 2/2008 | Itozawa et al. | |
| 2008/0239945 A1 | 10/2008 | Gregg | |
| 2010/0191942 A1* | 7/2010 | Owaki | .................. G06F 11/165<br>712/228 |
| 2010/0199046 A1 | 8/2010 | Weiberle et al. | |
| 2012/0269510 A1* | 10/2012 | Hui | .................... H04Q 11/0005<br>398/50 |
| 2013/0111075 A1* | 5/2013 | Sato | .................... G06F 13/4022<br>710/16 |

FOREIGN PATENT DOCUMENTS

| | | |
|---|---|---|
| JP | 2003-337758 | 11/2003 |
| JP | 2005-285119 | 10/2005 |
| JP | 2008-046996 | 2/2008 |
| JP | 2008-077151 | 4/2008 |
| JP | 2008-518296 | 5/2008 |
| WO | WO 2006/045773 | 5/2006 |

OTHER PUBLICATIONS

International Search Report dated Sep. 11, 2012 in corresponding international application PCT/J P2012/066188.

Extended European Search Report dated Aug. 4, 2015 in corresponding European Patent Application No. 12879810.5.

\* cited by examiner

FIG.4

|  | ACTIVE | BACKUP |
|---|---|---|
| MEMORY ACCESS REQUEST SENT FROM CPU | RECEIVE | SNOOP |
| REPLY SIGNAL SENT TO CPU | OUTPUT | SNOOP |
| MEMORY ACCESS SIGNAL SENT TO MEMORY | OUTPUT | SNOOP |
| REPLY FROM MEMORY | RECEIVE | SNOOP |

FIG.6

| COMPARISON TARGET | | COMPARISON CONTENT |
|---|---|---|
| ACTIVE SYSTEM | STANDBY SYSTEM | |
| MAread | MBread | PORT NUMBER, ADDRESS |
| CAdata | CBdata | PORT NUMBER, DATA CONTENT |

INFORMATION PROCESSING APPARATUS AND SWITCH FAILURE DETECTION METHOD

CROSS-REFERENCE TO RELATED APPLICATION

This application is a continuation of International Application No. PCT/JP2012/066188, filed on Jun. 25, 2012 and designating the U.S., the entire contents of which are incorporated herein by reference.

FIELD

The embodiments discussed herein are directed to an information processing apparatus and a failure detection method of the information processing apparatus.

BACKGROUND

There are conventionally known switches that connect arithmetic processing unit to memories. An example of this type of switch includes a known switch that connects, in a system in which central processing units (CPUs) that function as arithmetic processing units are connected to memories that function as storage devices, an arbitrary CPU to an arbitrary memory by switching the connection.

In the following, an example of such a switch will be described with reference to FIG. 11. FIG. 11 is a schematic diagram illustrating an example of a switch that connects CPUs to memories. An information processing apparatus 60 illustrated in FIG. 11 includes a plurality of CPUs 61 to 64, a switch 65, and a plurality of memories 66 to 69. Furthermore, the switch 65 is connected to each of the CPUs 61 to 64 and each of the memories 66 to 69.

For example, when the switch 65 receives an instruction from a user to connect the CPU 61 to the memory 66, the switch 65 connects the CPU 61 to the memory 66 and relays data that is sent and received between the CPU 61 and the memory 66. Furthermore, for example, when the switch 65 receives an instruction from a user to connect the CPU 62, the memory 67, and the memory 68, the switch 65 connects the CPU 62 to the memory 67, connects the CPU 62 to the memory 68, and then relays data that is sent and received among the CPU 62, the memory 67, and the memory 68. In this way, by combining the specified arbitrary CPU with the specified arbitrary memory, the switch 65 enhances the flexibility of a system of the information processing apparatus 60. With regard to the conventional techniques, see, for example, Japanese Laid-open Patent Publication No. 2003-337758, Japanese Laid-open Patent Publication No. 2001-318901, and Hideharu Amano "*Parallel Computers*" Information system schoolbook series 18$^{th}$ volume, Shokodo Co. Ltd., p. 8-9p, Jun. 5, 1996.

However, with the technology in which a single switch connects CPUs to memories, if the switch has failed, a memory access is not possible and the failure affects all of the CPUs. Consequently, there is a problem in that the reliability of the information processing apparatus becomes low.

Thus, in order to improve the reliability, there may be a method of multiplexing a switch that connects CPUs to memories and, if an active system switch has failed, continuing a process by using a standby system switch. However, if the switch that connects the CPUs to the memories is multiplexed, a method of detecting a failure from the active system switch or a method of switching the active system switch at an appropriate timing needs to be implemented.

SUMMARY

According to an aspect of an embodiment of the present invention, an information processing apparatus includes a storage device, an arithmetic processing unit, a first converting device, and a second converting device. The storage device outputs stored data in accordance with a memory access request that is received. The arithmetic processing unit performs an arithmetic operation on the data that is output by the storage device. The first converting device includes a first converting unit that converts a memory access request issued by the arithmetic processing unit to a memory access signal and a sending unit that sends the memory access signal converted by the first converting unit to the storage device. The second converting device includes a second converting unit that converts a memory access request issued by the arithmetic processing unit to a memory access signal, a first acquiring unit that acquires the memory access signal that is sent by the first converting device to the storage device, and a determining unit that compares the content of a memory access performed by using the memory access signal converted by the second converting unit with the content of a memory access performed by using the memory access signal acquired by the first acquiring unit and that determines, when the contents of the memory accesses performed by using the memory access signals do not match, that the first converting device has failed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a schematic diagram illustrating a process of sending and receiving a signal performed by the switch LSI according to the first embodiment;

FIG. 6 is a schematic diagram illustrating the content of comparison performed by a data queue comparing unit;

DESCRIPTION OF EMBODIMENTS

Preferred embodiments of an information processing apparatus and a failure detection method of the information processing apparatus according to the present invention will be described below with reference to the accompanying drawings.

[a] First Embodiment

Figure 1:
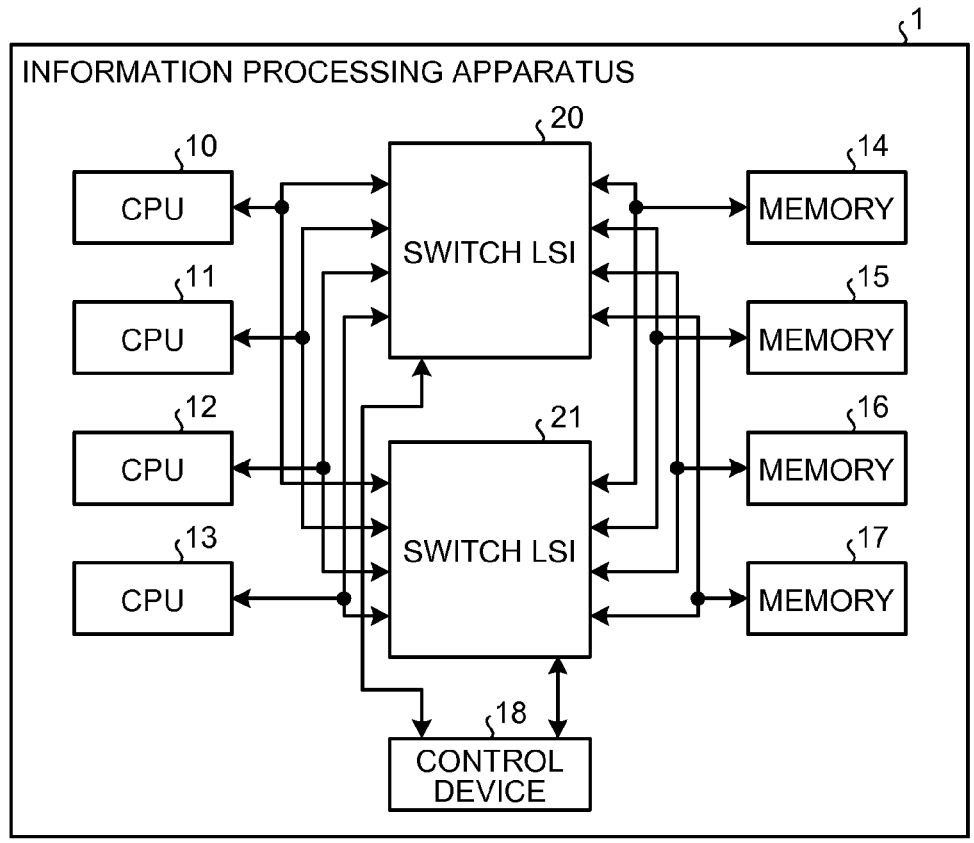
FIG. 1 is a schematic diagram illustrating an example of an information processing apparatus according to a first embodiment.

In a first embodiment described below, an example of an information processing apparatus will be described with reference to FIG. 1. FIG. 1 is a schematic diagram illustrating an example of an information processing apparatus according to a first embodiment. An information processing apparatus 1 is an information processing apparatus, such as, a building block, a blade, a server, or the like, that includes at least a plurality of central processing units (CPUs) and that executes an arithmetic processing.

As illustrated in FIG. 1, the information processing apparatus 1 includes a plurality of CPUs 10 to 13, a plurality of memories 14 to 17, a control device 18, a switch LSI 20, and a switch LSI 21. Furthermore, each of the CPUs 10 to 13 is connected to the switch LSI 20 and the switch LSI 21 by buses.

Furthermore, each of the memories 14 to 17 is connected to the switch LSI 20 and the switch LSI 21 by buses. Furthermore, the control device 18 is connected to the switch LSI 20 and the switch LSI 21 and controls the switch LSI 20 and the switch LSI 21 via, for example, an Inter-Integrated Circuit (I2C) or the like.

Although not illustrated in FIG. 1, in addition to the units 10 to 21 illustrated in FIG. 1, the information processing apparatus 1 may also include an interface or the like that performs communication with another information processing apparatus. Furthermore, the information processing apparatus 1 may also include a plurality of CPUs other than the CPUs 10 to 13 or may also include a plurality of memories other than the memories 14 to 17. Furthermore, in a description below, it is assumed that the CPUs 11 to 13 have the same function as that performed by the CPU 10; therefore, descriptions thereof will be omitted. Furthermore, it is assumed that the memories 15 to 17 have the same function as that performed by the memory 14; therefore, descriptions thereof will be omitted.

The CPU 10 is an arithmetic processing unit that executes an arithmetic processing by using data stored in the memories 14 to 17. Specifically, when the CPU 10 reads the data stored in the memories 14 to 17, the CPU 10 issues, to the switch LSI 20, a memory access request for requesting the data. When the CPU 10 receives, from the switch LSI 20, data that is targeted for the reading, the CPU 10 performs an arithmetic processing by using the received data. Furthermore, when the CPU 10 writes data to the memories 14 to 17, the CPU 10 issues, to the switch LSI 20, a memory access request for writing the data.

At this point, the CPU 10 sends a memory access request to the switch LSI 20 via the bus. The CPU 10 outputs, to the bus, a memory address that is targeted for the reading or the writing of data; information that indicates the content of the memory access is the reading of the data or is the writing of the data; and a memory access request that includes, for example, data targeted for the writing. Then, the CPU 10 acquires, from the switch LSI 20 via the bus, data that is targeted for the reading.

The memory 14 is a storage device that stores therein data that is used by the CPUs 10 to 13 for the arithmetic processing and is, for example, a synchronous dynamic random access memory (SDRAM). Furthermore, for example, when the memory 14 receives, from the switch LSI 20 via the bus, a memory access signal that instructs to read data, the CPUs 10 to 13 outputs the data targeted for the reading to the bus. Furthermore, when the memory 14 receives, from the switch LSI 20 via the bus, a memory access signal that includes an instruction to write data and that includes data to be written, the memory 14 writes the data in accordance with the content indicated by the received memory access signal.

The control device 18 controls the switch LSI 20 and the switch LSI 21. Specifically, the control device 18 operates the switch LSI 20 as an active system switch and operates the switch LSI 21 as a standby system switch. Furthermore, if the switch LSI 21 determines that the switch LSI 20 has failed, the control device 18 disconnects the switch LSI 20 and operates the switch LSI 21 as an active system switch. Furthermore, the control device 18 is packaged by using a small and simple logic in which the probability of a failure is small.

The switch LSI 20 is connected to the CPUs 10 to 13 and to the memories 14 to 17 via buses; connects a specified CPU to a specified memory; and relays data. Specifically, the switch LSI 20 connects, functioning as an active system switch LSI, the CPU to the memory specified by a user. For example, if a user sets the switch LSI 20 such that the CPU 10 is connected to the memories 14 to 16, the switch LSI 20 performs a memory access to each of the memories 14 to 16 in accordance with a memory access request issued by the CPU 10. Then, the switch LSI 20 converts the data output by each of the memories 14 to 16 to a reply signal and then sends the signal to the CPU 10.

Furthermore, when the switch LSI 20 receives, via the bus, the memory access request issued by the CPU 10, the switch LSI 20 converts the received memory access request to a memory access signal that is to be output to the memory 14. Then, the switch LSI 20 outputs the memory access signal to the memory 14.

Figure 2:
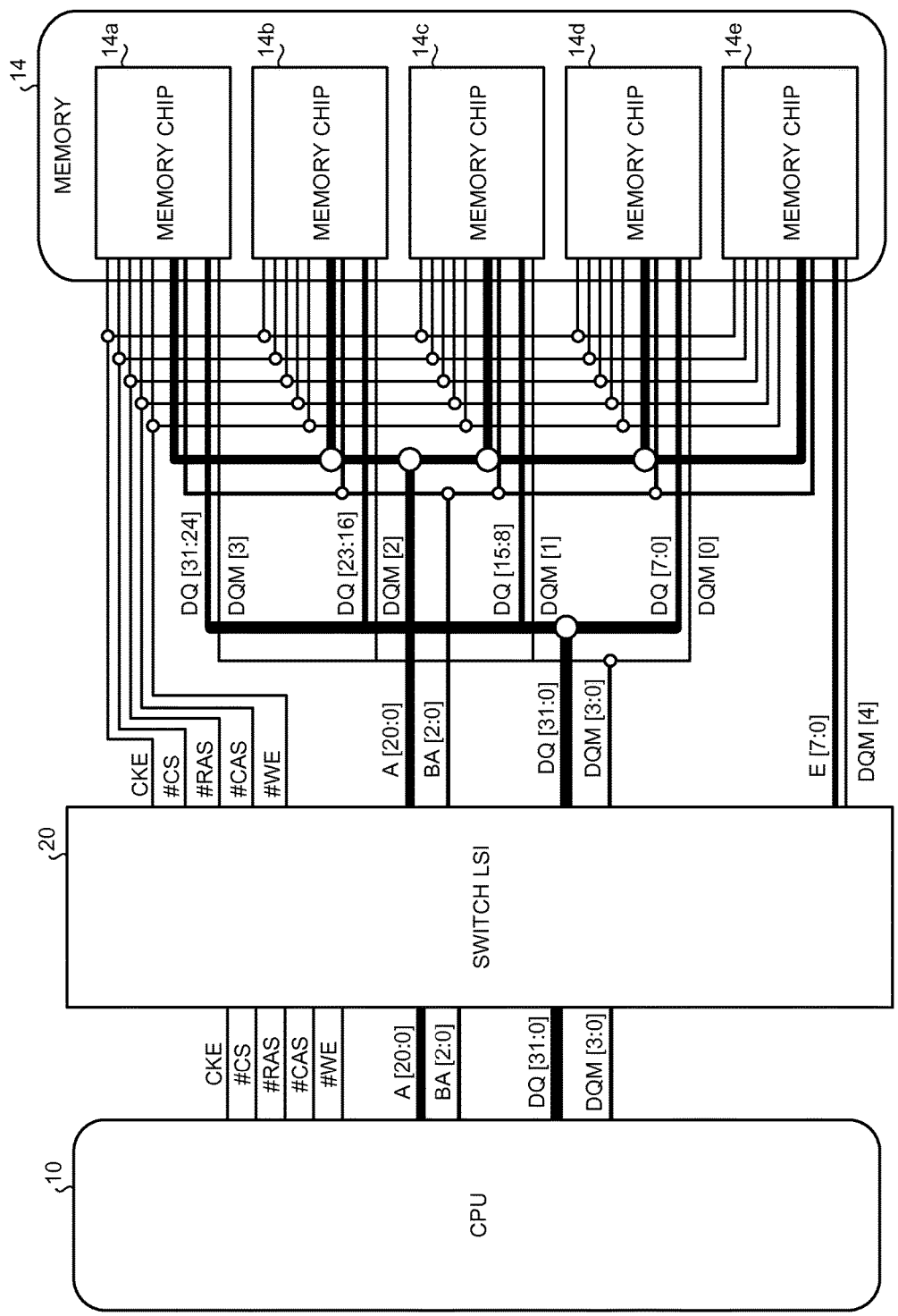
FIG. 2 is a schematic diagram illustrating an example of buses that connect a CPU to a switch LSI and an example of buses that connect the switch LSI to a memory according to the first embodiment.

FIG. 2 is a schematic diagram illustrating an example of buses that connect a CPU to a switch LSI and an example of buses that connect the switch LSI to a memory according to the first embodiment. In FIG. 2, in order to avoid the drawing being complicated, the buses that connect the CPU 10, the switch LSI 20, and the memory 14 are illustrated; however, it is assumed that the switch LSI 20 is connected to the CPUs 11 to 13 and to the memories 14 to 17 via the same buses as those illustrated in FIG. 2.

In the example illustrated in FIG. 2, the memory 14 includes a plurality of memory chips 14a to 14d. Furthermore, the CPU 10 is connected to the switch LSI 20 by buses that include signal lines that are used to transmit CKE, #CS, #RAS, #CAS, #WE, A[20:0], BA[2:0], DQ[31:0], and DQM [3:0].

The symbol represented by CKE (Clock Enable) mentioned here is a clock enable signal indicating whether a clock is valid. The symbol represented by #CS (Chip Select) is a chip select signal that indicates a memory chip targeted for the writing. Furthermore, the symbol represented by #RAS (Row Address Strobe) is a row address strobe signal that is a command bit. Furthermore, the symbol represented by #CAS (Column Address Strobe) is a column address strobe signal that is a command bit.

Furthermore, the symbol represented by #WE (Write Enable) is a write enable signal that specifies a command by combining #RAS and #CAS and that basically indicates whether a request for a memory access is reading data or writing data. Furthermore, the symbol represented by A[20:0] is a signal that indicates a 21-bit address. Furthermore, the symbol represented by BA[2:0] (Bank Address) is bank address signal that selects a bank that is targeted for the reading or the writing. Furthermore, the symbol represented by DQ[31:0] is a 32-bit data signal. Furthermore, the symbol represented by DQM[3:0] is a data mask signal.

Furthermore, the switch LSI 20 writes data to each of the memory chips 14a to 14d in the memory 14 and read data from each of the memory chips 14a to 14d via the buses illustrated in FIG. 2. Furthermore, from among the buses that connect the switch LSI 20 to the memory 14, E[7:0] is an enable (Enable) signal.

A description will be given here by referring back to FIG. 1. When the switch LSI 20 has failed, by switching the connection, the switch LSI 21 connects, instead of the switch LSI 20, the CPUs 10 to 13 to the memories 14 to 17. Specifically, the switch LSI 21 connects the CPU 10 via the buses that connect the CPU 10 to the switch LSI 20 illustrated in FIG. 2. Furthermore, the switch LSI 21 connects the memory 14 via the buses that connect the switch LSI 20 to the memory 14 illustrated in FIG. 2.

Namely, the switch LSI 20 and the switch LSI 21 are connected to the CPU 10 by shared buses and, also for the other CPUs 11 to 13, are similarly connected to each of the CPUs 11 to 13 by shared buses. Furthermore, the switch LSI 20 and the switch LSI 21 are connected to the memory 14 by shared buses and, also for the other memories 15 to 17, are similarly connected to each of the memories 15 to 17 shared buses. Consequently, by snooping a signal flowing through the buses, the switch LSI 21 acquires a memory access request that is output by the CPU 10, a signal that is output by the switch LSI 20, and the data that is read from the memory 14.

Then, from the memory access request that is output by the CPU 10, the switch LSI 21 generates a memory access signal that is to be sent to the memory 14. Furthermore, the switch LSI 21 snoops, from the bus, a memory access signal that is output by the switch LSI 20 and compares the content of the memory access that is indicated by the memory access signal generated by the switch LSI 21 by itself device with the content of the memory access that is indicated by the memory access signal snooped from the bus. If the contents of the memory access indicated by the memory access signals do not match, the switch LSI 21 determines that the switch LSI 20 has failed and then notifies the control device 18 that the switch LSI 20 has failed.

Furthermore, the switch LSI 21 snoops, from the bus, the data that is read from each of the memories 14 to 17 and converts the snooped data to a reply signal. Furthermore, the switch LSI 21 snoops, from the bus, the reply signal that includes the data that has been read by the switch LSI 20 from each of the memories 14 to 17. If the content of the data indicated by the converted reply signal does not match the content of the data that is indicated by the reply signal that is snooped from the bus, the switch LSI 21 determines that the switch LSI 20 has failed and then notifies the control device 18 that the switch LSI 20 has failed.

Then, the control device 18 disconnects the switch LSI 20 and sets the switch LSI 21 to an active system switch. By doing so, the switch LSI 21 connects, functioning as an active system switch, each of the CPUs 10 to 13 to each of the memories 14 to 17.

In the above, a description has been given of an example in which the switch LSI 20 is an active system switch and the switch LSI 21 is a standby system switch; however, the embodiment is not limited thereto. Namely, the switch LSI 21 may also operate as an active system switch and the switch LSI 20 may also operate as a standby system switch.

Figure 3:
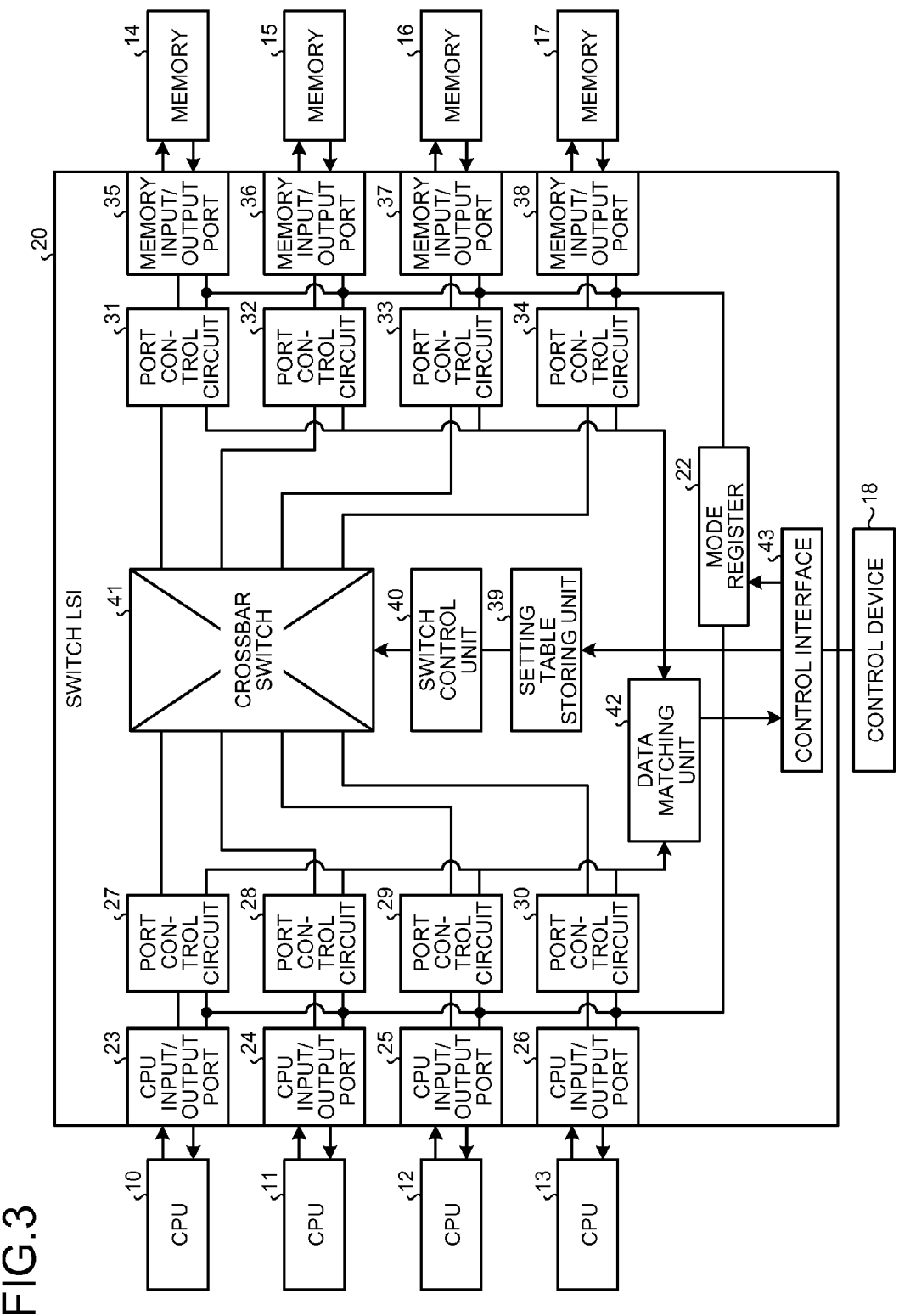
FIG. 3 is a schematic diagram illustrating an example of the functional configuration of the switch LSI according to the first embodiment.

In the following, the functional configuration of the switch LSI 20 will be described with reference to FIG. 3. FIG. 3 is a schematic diagram illustrating an example of the functional configuration of the switch LSI according to the first embodiment. It is assumed that the switch LSI 21 has the same functional configuration as that of the switch LSI 20; therefore, a description thereof will be omitted. Furthermore, in a description below, it is assumed that the switch LSI 20 has a function of operating as a standby system switch, in addition to having a function of operating as an active system switch.

As illustrated in FIG. 3, the switch LSI 20 includes a mode register 22, a plurality of CPU input/output ports 23 to 26, a plurality of port control circuits 27 to 30, a plurality of port control circuits 31 to 34, and a plurality of memory input/output ports 35 to 38. Furthermore, the switch LSI 20 includes a setting table storing unit 39, a switch control unit 40, a crossbar switch 41, a data matching unit 42, and a control interface 43.

Furthermore, it is assumed that, by performing the same process as that performed by the CPU input/output port 23, each of the CPU input/output ports 24 to 26 sends and receives signals that are sent and received between the CPUs 11 to 13 and the switch LSI 20; therefore, descriptions thereof will be omitted. Furthermore, it is assumed that each of the port control circuits 32 to 34 performs the same function as that performed by the port control circuit 27; therefore, a description thereof will be omitted. Furthermore, it is assumed that each of the port control circuits 32 to 34 performs the same function as that performed by the port control circuit 31; therefore, a description thereof will be omitted. Furthermore, it is assumed that each of the memory input/output ports 36 to 38 performs the same function as that performed by the memory input/output port 35; therefore, a description thereof will be omitted.

The mode register 22 is a register that stores therein information that indicates whether the switch LSI 20 is an active system switch or a standby system switch. For example, when the switch LSI 20 is operated as an active system switch, the mode register 22 stores therein the value "1" that indicates that the switch LSI 20 is an Active. Furthermore, when the switch LSI 20 is operated as a standby system switch, the mode register 22 stores therein the value "0" that indicates that the switch LSI 20 is a Backup.

The CPU input/output port 23 is a port that sends and receives a signal to and from the CPU 10 via the bus. Specifically, if the value stored in the mode register 22 is "1", i.e., if the switch LSI 20 is an active system switch, the CPU input/output port 23 performs the following process.

First, when the CPU input/output port 23 receives, via the bus, a memory access request that is output from the CPU 10, the CPU input/output port 23 outputs the received memory access request to the port control circuit 27. Furthermore, when the CPU input/output port 23 receives, from the port control circuit 27, a reply signal that is converted from the data read from each of the memories 14 to 17, the CPU input/output port 23 sends the reply signal to the CPU 10 via the bus.

In contrast, if the value stored in the mode register 22 is "0", i.e., if the switch LSI 20 is a standby system switch, the CPU input/output port 23 performs the following process. First, the CPU input/output port 23 snoops a memory access request that is output by the CPU 10 via the bus and sends the snooped memory access request to the port control circuit 27. Furthermore, the CPU input/output port 23 snoops a reply signal that is output by the active system switch LSI 21 to the CPU 10 via the bus. Then, the CPU input/output port 23 outputs the snooped reply signal to the port control circuit 27.

The port control circuit 27 is a control circuit for a port for a signal that is sent and received between the CPU 10 and the switch LSI 20. Specifically, if the value stored in the mode register 22 is "1", i.e., if the switch LSI 20 is an active system switch, the port control circuit 27 performs the following process.

First, the port control circuit 27 converts the memory access request received by the CPU input/output port 23 to a memory access request that is used inside the switch LSI 20. Then, the port control circuit 27 sends, via the crossbar switch 41, the converted memory access request to one of the port control circuits 31 to 34 for a port that is associated with the memory that is the sending destination of the memory access request. For example, if the sending destination of the memory access request is the memory 14, the port control circuit 27 sends the converted memory access request to the port control circuit 31.

Furthermore, when the port control circuit 27 receives, via the crossbar switch 41, the data read from one of the memories 14 to 17, the port control circuit 27 converts the received data to a reply signal that is to be sent to the CPU 10. Then, the port control circuit 27 sends the converted reply signal to the CPU input/output port 23.

In contrast, if the value stored in the mode register 22 is "0", i.e., if the switch LSI 20 is a standby system switch, the port control circuit 27 performs the following process.

First, when the port control circuit 27 receives a memory access request that is snooped by the CPU input/output port 23 from the bus, the port control circuit 27 converts the received memory access request to a memory access request that is used inside the switch LSI 20. Then, the port control circuit 27 sends the converted memory access request to the port control circuit of the port that is associated with the memory that is the sending destination of the memory access request.

Furthermore, when the port control circuit 27 receives a reply signal snooped by the CPU input/output port 23, i.e., receives a reply signal output by the active system switch LSI 21, the port control circuit 27 sends the received reply signal to the data matching unit 42. Furthermore, the port control circuit 27 receives, from the bus that connects the switch LSI 20 and the switch LSI 21 to the memories 14 to 17 via the crossbar switch 41, data that is snooped by one of the memory input/output ports 35 to 38. Then, the port control circuit 27 converts the received data to a reply signal and sends the converted reply signal to the data matching unit 42.

The port control circuit 31 is a control circuit that controls a port that sends and receives a signal between the memory 14 and the switch LSI 20. Specifically, if the value stored in the mode register 22 is "1", the port control circuit 31 performs the following process. First, the port control circuit 31 receives a memory access request for the memory 14 via the crossbar switch 41. Then, the port control circuit 31 converts the received memory access request to a memory access signal that is to be sent to the memory and then sends the converted memory access signal to the memory input/output port 35.

Furthermore, when the port control circuit 31 receives, from the memory input/output port 35, the data read from the memory 14, the port control circuit 31 converts the received data to the data that is used inside the switch LSI 20. Then, the port control circuit 31 sends, via the crossbar switch 41, the converted data to the associated port control circuit of the port that is connected to the CPU that has issued the memory access request.

In contrast, if the value stored in the mode register 22 is "0", the port control circuit 31 performs the following process. First, the port control circuit 34 receives the memory access signal snooped by the memory input/output port 35 via the bus, i.e., the memory access signal that is output by the active system switch LSI 21 to the memory 14. Then, the port control circuit 31 sends the memory access signal to the data matching unit 42.

Furthermore, when the port control circuit 31 receives the data snooped by the memory input/output port 35 via the bus, i.e., the data read from the memory 14, the port control circuit 31 converts the received data to internal data that is used in the switch LSI 20. Then, the port control circuit 31 sends, via the crossbar switch 41, the converted data to the port control circuit of the port that is connected to the CPU that corresponds to the sending destination of the received data.

Furthermore, the port control circuit 34 receives, via the crossbar switch 41, a memory access request snooped one of the CPU input/output ports 23 to 26, i.e., a memory access request that is output by each of the CPUs 10 to 13. Then, the port control circuit 31 converts the received memory access request to a memory access signal and sends the converted memory access signal to the data matching unit 42.

The memory input/output port 35 is a port that sends and receives a signal to and from the memory 14 via the bus. Specifically, if the value stored in the mode register 22 is "1", the memory input/output port 35 performs the following process. First, when the memory input/output port 35 receives a memory access signal from the port control circuit 31, the memory input/output port 35 sends the memory access signal to the memory 14 via the bus. Furthermore, when the memory input/output port 35 receives data read from the memory 14, the memory input/output port 35 sends the received data to the port control circuit 31 via the bus.

In contrast, if the value stored in the mode register 22 is "0", the memory input/output port 35 performs the following process. First, the memory input/output port 35 snoops, via the bus, a memory access signal that is output by the active system switch LSI 21. Then, the memory input/output port 35 sends the snooped memory access signal to the port control circuit 31. Furthermore, the memory input/output port 35 snoops, via the bus, data that is read from the memory 14. Then, the memory input/output port 35 sends the snooped data to the port control circuit 31.

In the following, a difference between a process of sending and receiving a signal when the switch LSI 20 operates as an active system switch and a process of sending and receiving a signal when the switch LSI 20 operates as a standby system switch will be described with reference to FIG. 4. FIG. 4 is a schematic diagram illustrating a process of sending and receiving a signal performed by the switch LSI according to the first embodiment. FIG. 4 illustrates the status of the switch LSI 20 indicating whether the switch LSI 20 receives or outputs data, i.e., a memory access request from each of the CPUs 10 to 13, a reply signal to be sent to each of the CPUs 10 to 13, a memory access signal to be sent to each of the memories 14 to 17, a reply received from each of the memories 14 to 17.

As illustrated in FIG. 4, if "1" that indicates Active is stored in the mode register 22, i.e., the switch LSI 20 operates as an active system switch, the switch LSI 20 performs a process on each signal as follows. Namely, the switch LSI 20 receives a memory access requests sent from one of the CPUs 10 to 13 and outputs reply signals that are sent to one of the CPUs 10 to 13. Furthermore, the switch LSI 20 outputs a memory access signal sent to each of the memories 14 to 17 and receives a reply from each of the memories 14 to 17.

In contrast, if "0" that indicates Backup is stored in the mode register 22, i.e., the switch LSI 20 operates as a standby system switch, the switch LSI 20 performs a process on each signal as follow. Namely, the switch LSI 20 snoops a memory access request received from one of the CPUs 10 to 1 and snoops a reply signal that is to be sent to the CPU to which the signal is output by the switch LSI 21 that is an active system switch output. Furthermore, the switch LSI 20 snoops a memory access signal that is output by the switch LSI 21 that is the active system switch and snoops a reply that is output one of the memories 14 to 17.

A description will be given here by referring back to FIG. 3. The setting table storing unit 39 stores therein a setting table that indicates a combination between each of the CPUs 10 to 13 and each of the memories 14 to 17. For example, the setting table storing unit 39 stores therein a setting table indicating that the CPU 10 is connected to the memory 14. Furthermore, for example, the setting table storing unit 39 stores the setting table indicating that the CPU 11, the memory 15, and the memory 16 are connected.

The switch control unit 40 controls the crossbar switch 41 in accordance with the setting table stored by the setting table storing unit 39. For example, if the setting table storing unit 39 stores therein the setting table that indicates that the CPU 10 is connected to the memory 14, the switch control unit 40 controls the crossbar switch 41 as follows. Namely, the switch control unit 40 controls the crossbar switch 41 such that the port control circuit 27 of the port connected to the CPU 10 is to be connected to the port control circuit 31 of the port that is connected to the memory 14.

The crossbar switch 41 is a switch that connects the port control circuits 27 to 30 to the port control circuits 31 to 34 in an arbitrary combination. For example, under the control of the switch control unit 40, the crossbar switch 41 connects the port control circuit 27 to the port control circuit 31 and connects the port control circuit 28 to the port control circuit 32 and the port control circuit 33.

If the switch LSI 20 operates as a standby system switch, the data matching unit 42 determines whether the active system switch LSI 21 has failed. For example, the data matching unit 42 receives, from the port control circuit 31, the memory access signal that is output from the active system switch LSI 21 and that is snooped by the memory input/output port 35. Furthermore, the data matching unit 42 receives the memory access signal that is converted by the port control circuit 31 from the memory access request that is snooped by the CPU input/output port 23.

Then, the data matching unit 42 determines whether the contents of the memory accesses indicated by the received memory access signals match. Thereafter, if the contents of the memory accesses indicated by the received memory access signals do not match, the data matching unit 42 determines that the switch LSI 21 has failed and notifies the control device 18 via the control interface 43 that the switch LSI 21 has failed.

At this point, as with the lockstep method, if the waveforms of the memory access signals received by the data matching unit 42 are compared, the information processing apparatus 1 needs to operate the switch LSI 20 and the switch LSI 21 by using the same clock. However, instead of comparing the waveforms of the memory access signals, the data matching unit 42 compares the contents of the memory accesses indicated by the memory access signals. Thus, the information processing apparatus 1 does not need to operate the switch LSI 20 and the switch LSI 21 by using the same clock. Consequently, the information processing apparatus 1 can improve the degree of freedom of the operation performed inside the switch LSI 20 and the switch LSI 21.

Furthermore, the data matching unit 42 receives, from the port control circuit 27, a reply signal converted by the port control circuit 27 from the data that is output by the memory 14 and that is snooped by the memory input/output port 35. Furthermore, the data matching unit 42 receives, from the port control circuit 27, a reply signal that is output by the active system switch LSI 21 and that is snooped by the CPU input/output port 23. Then, the data matching unit 42 compares the contents indicated by the received reply signals. If the contents do not match, the data matching unit 42 determines that the switch LSI 21 has failed and then notifies the control device 18 via the control interface 43 that the switch LSI 21 has failed.

The control interface 43 controls communication between the switch LSI 20 and the control device 18. For example, if the control interface 43 notified by the data matching unit 42 that the switch LSI 21 has failed, the control interface 43 notifies the control device 18 that the switch LSI 21 has failed. Furthermore, if the control interface 43 receives an instruction to rewrite the value of the mode register 22 from the control device 18, the control interface 43 rewrites the value stored in the mode register 22 in accordance with the received instruction.

For example, if the control device 18 operates the switch LSI 20 as an active system, the control device 18 instructs the mode register 22 to store "1". Then, the control interface 43 updates the value stored in the mode register 22 to "1". Furthermore, if the control device 18 operates the switch LSI 20 as a standby system, the control device 18 instructs the mode register 22 to store "0". Then, the control interface 43 updates the value stored in the mode register 22 to "0".

Furthermore, in accordance with the instruction from the control device 18, the control interface 43 rewrites the setting table stored in the setting table storing unit 39. Namely, by rewriting the setting table in accordance with the instruction from the control device 18, the control interface 43 changes the combinations of the CPUs 10 to 13 and the memories 14 to 17.

Figure 5:
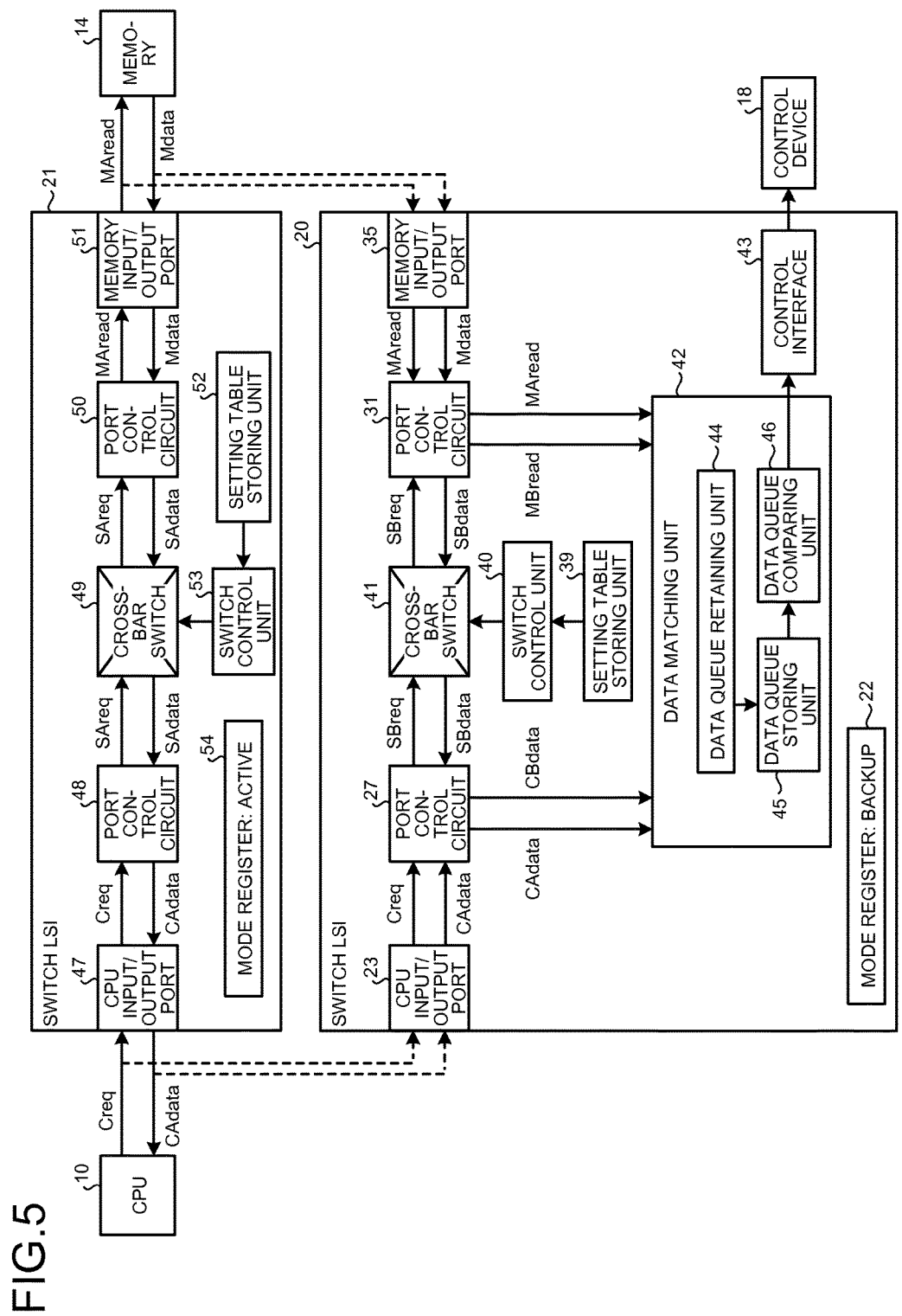
FIG. 5 is a schematic diagram illustrating a process performed when the switch LSI according to the first embodiment operates as a standby system switch.

In the following, an example of a process performed when the switch LSI 20 operates as a standby system switch will be described with reference to FIG. 5. FIG. 5 is a schematic diagram illustrating a process performed when the switch LSI according to the first embodiment operates as a standby system switch. FIG. 5 illustrates an example in which the switch LSI 20 and the switch LSI 21 connect the CPU 10 to the memory 14.

As illustrated in FIG. 5, the switch LSI 21 includes a CPU input/output port 47, a port control circuit 48, a crossbar switch 49, a port control circuit 50, a memory input/output port 51, a setting table storing unit 52, a switch control unit 53, and a mode register 54. It is assumed that the units 47 to 54 have the same function as that performed by the CPU input/output port 23, the port control circuit 27, the crossbar switch 41, the port control circuit 31, the memory input/output port 35, the setting table storing unit 39, the switch control unit 40, and the mode register 22, respectively. Furthermore, the data matching unit 42 includes a data queue retaining unit 44, a data queue storing unit 45, and a data queue comparing unit 46.

At this point, the value "1" indicating Active is stored in the mode register 54 in the switch LSI 21 and the value "0" indicating Backup is stored in the mode register 22 in the switch LSI 20. Consequently, the switch LSI 20 operates as a standby system switch and the switch LSI 21 operates as an active system switch.

First, a description will be given of a process performed by the switch LSI 21 that is an active system switch. For example, the CPU input/output port 47 acquires "Creq" that is a data read request from the memory 14 issued by the CPU 10 and then sends the acquired "Creq" to the port control circuit 48. In such a case, the port control circuit 48 converts "Creq" to "SAreq" that is an internal signal used in the switch LSI 21 and sends "SAreq" to the port control circuit 50 via the crossbar switch 49. Then, the port control circuit 50 converts "SAreq" to "MAread" that is a memory access signal and outputs "MAread" from the memory input/output port 51.

Subsequently, the memory input/output port 51 receives "Mdata" that is the data read from the memory 14 and sends the received "Mdata" to the port control circuit 50. In such a case, the port control circuit 50 converts "Mdata" to "SAdata" that is an internal signal used in the switch LSI 21 and then sends "SAdata" to the port control circuit 48 via the crossbar switch 49. Then, the port control circuit 48 converts "SAdata" to "CAdata" that is a reply signal and then sends "CAdata" from the CPU input/output port 47 to the CPU 10.

In the following, a description will be given of a case performed by the switch LSI 20 that is a standby system. First, the CPU input/output port 23 snoops "Creq" issued by the CPU 10 from the bus that connects the CPU 10 to both the switch LSI 20 and the switch LSI 21 and sends "Creq" to the port control circuit 27.

In such a case, the port control circuit 27 converts "Creq" to "SBreq" that is an internal signal used in the switch LSI 20 and then sends "SBreq" to the port control circuit 31 via the crossbar switch 41. Then, the port control circuit 31 converts "SBreq" to "MBread" that is a memory access signal and sends "MBread" to the data matching unit 42.

Furthermore, the memory input/output port 35 snoops "MAread", which is output by the switch LSI 21, from the bus that connects the memory 14 to both the switch LSI 20 and the switch LSI 21 and then sends "MAread" to the port control circuit 31. Then, the port control circuit 31 sends "MAread" to the data matching unit 42.

Furthermore, the memory input/output port 35 snoops "Mdata", which is output by the memory 14, from the bus that connects the memory 14 to both the switch LSI 20 and the switch LSI 21 and then sends "Mdata" to the port control circuit 31. In such a case, the port control circuit 31 converts "Mdata" to an internal signal "SBdata" that is used in the switch LSI 20 and then sends "SBdata" to the port control circuit 27 via the crossbar switch 41. Then, the port control circuit 27 converts "SBdata" to "CBdata" that is a reply signal and then sends "CBdata" to the data matching unit 42.

Furthermore, the CPU input/output port 23 snoops "CAdata", which is output by the switch LSI 21, from the bus that connects the CPU 10 to both the switch LSI 20 and the switch LSI 21 and then sends "CAdata" to the port control circuit 27. Then, the port control circuit 27 sends "CAdata" to the data matching unit 42.

The data queue retaining unit 44 receives "CAdata", "CBdata", "MAread", and "MBread" from the port control circuit 27 and the port control circuit 31. Then, the data queue retaining unit 44 stores the received signals "CAdata", "CBdata", "MAread", and "MBread" in the data queue storing unit 45.

When the memory access signal or the reply signal generated by the switch LSI 21 is stored in the data queue storing unit 45, the data queue comparing unit 46 performs the following process. Namely, the data queue comparing unit 46 acquires the memory access signals generated by the switch LSI 21 and compares the acquired memory access signals with each of the memory access signals generated by the switch LSI 20.

Specifically, the data queue comparing unit 46 extracts, from each of the memory access signals, a memory address that is targeted for a memory access and a port number of a port connected to a memory that is targeted for the memory access. Then, the data queue comparing unit 46 determines whether the extracted memory addresses and the port numbers match. If memory addresses and the port numbers do not match, the data queue comparing unit 46 notifies the control interface 43 that the switch LSI 21 has failed.

Furthermore, the data queue comparing unit 46 acquires the reply signals generated by the switch LSI 21 and compares the acquired reply signals with the reply signals generated by the switch LSI 20. Specifically, the data queue comparing unit 46 acquires, from each of the reply signals, data to be sent and a port number of a port connected to a CPU to which a reply signal is sent. Then, the data queue comparing unit 46 determines whether the acquired data and the port numbers match. If they do not match, the data queue comparing unit 46 notifies the control interface 43 that the switch LSI 21 has failed.

FIG. 6 is a schematic diagram illustrating the content of comparison performed by a data queue comparing unit. For example, the data queue comparing unit 46 compares the content of the memory access signal "MAread" generated by the switch LSI 21 that is an active system with the content of the memory access signal "MBread" generated by the switch LSI 20 that is a standby system. Specifically, the data queue comparing unit 46 compares a port number of a port connected to a memory that is the sending destination for "MAread" and "MBread" and a memory address that is targeted for the memory access in order to determine whether they do match.

Furthermore, the data queue comparing unit 46 compares the content of the reply signal "CAdata" generated by the active system switch LSI 21 with the content of the reply signal "CBdata" generated by the switch LSI 20 that is a standby system. Specifically, the data queue comparing unit 46 compares the port number of the port that is connected to the CPU to which the reply signal is sent with the content of the data in order to determine whether they do match.

Furthermore, the data queue comparing unit 46 may also each signal by taking into consideration the order of the memory accesses. For example, the CPU 10 issues a read request for the reading of data and, after that, if the CPU 11 issues a write request for the writing of data, the active system switch LSI 21 may sometimes performs the process on the write request first. Accordingly, when the read request and the write request are issued, if the switch LSI 21 issues a memory access signal in the inverse order of the issuing, the data queue comparing unit 46 does not determine that the switch LSI 21 has failed and then ends the process.

Furthermore, the data queue comparing unit 46 specifies a memory associated with each of the CPUs 10 to 13 as a combination in accordance with the content of the setting table stored in the setting table storing unit 39. Then, the data queue comparing unit 46 determines whether the switch LSI 21 outputs a memory access signal or outputs a reply signal in accordance with the specified combination.

In the example described above, a description has been given of a process performed when the CPU 10 issues a read request that indicates the reading of data; however, the embodiment is not limited thereto. For example, similarly, also in a case in which the CPU 10 issues a write request that indicates the writing of data, the data queue comparing unit 46 compares the content of the memory access signal or the reply signal converted by its own switch LSI with the content of the memory access signal or the reply signal that is output by the switch LSI 21. Furthermore, the data queue comparing unit 46 may also compare the contents of the memory access signals, the reply signals, signals in response to the read requests, or signals in response to the write requests that are output by the switch LSI 21.

Figure 7:
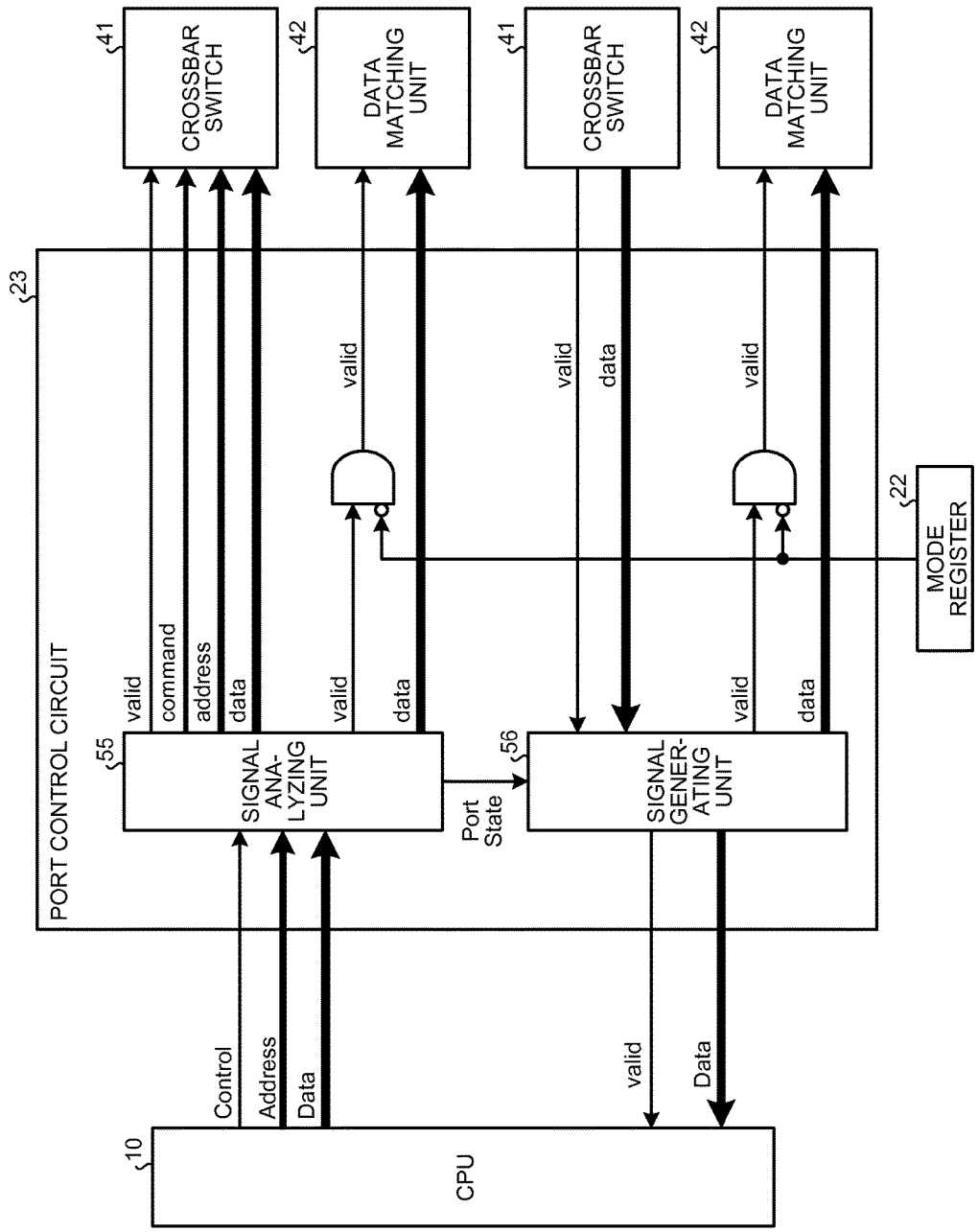
FIG. 7 is a schematic diagram illustrating an example of a port control circuit.

In the following, an example of the port control circuit 27 will be described with reference to FIG. 7. FIG. 7 is a schematic diagram illustrating an example of a port control circuit. In the example illustrated in FIG. 7, the port control circuit 27 includes a signal analyzing unit 55 and a signal generating unit 56.

For example, the signal analyzing unit 55 receives "Control", "Address", and "Data" as memory access requests from the CPU 10 via the CPU input/output port 23. In this example, "Control" mentioned here is a signal indicating whether a memory access is the reading of data or the writing of data, "Address" is a signal indicating a target memory address of the memory access, and "Data" is a signal indicating data targeted for the writing.

Then, the signal analyzing unit 55 generates "valid", "command", "address", and "data" as internal signals used in the switch LSI 20 and sends, via the crossbar switch 41, each of the generated signals to a port that is connected to a memory targeted for the memory access. In this example, "valid" is a signal indicating whether each of the signals represented by "command", "address", and "data" is valid.

Furthermore, when the signal analyzing unit 55 receives "Data" of a reply signal that is snooped by the CPU input/output port 23, the signal analyzing unit 55 outputs "valid" together with the received "data". At this point, the port control circuit 27 sends, as "valid" to the data matching unit 42, the logical conjunction of "valid", which is issued by the signal analyzing unit 55 together with a reply signal of "data", and a turnover value of the value stored in the mode register 22. Consequently, the data matching unit 42 acquires a reply signal of "data" only when the value in the mode register 22 indicates "0", i.e., only when the switch LSI 20 is a standby system switch.

Furthermore, if the signal generating unit 56 receives "data" that is acquired by converting the data that is received by the switch LSI 20 from a memory indicates "valid", the signal generating unit 56 sends the received "valid" and "data" to the CPU 10. Furthermore, if the signal generating unit 56 receives, in addition to "valid", "data" that is acquired by converting the data that is snooped by the switch LSI 20, the signal generating unit 56 sends "data" together with "valid" to the data matching unit 42.

In the example illustrated in FIG. 7, a description have been given of the port control circuit 27 of the port connected to the CPU 10; however, the same function may also be implemented by the port control circuit of the port connected to the memory 14.

Furthermore, the data matching unit 42 is, for example, an electronic circuit. An example of the electronic circuit used in this example includes an integrated circuit, such as an ASIC, a field programmable gate array (FPGA), or the like.

Figure 8:
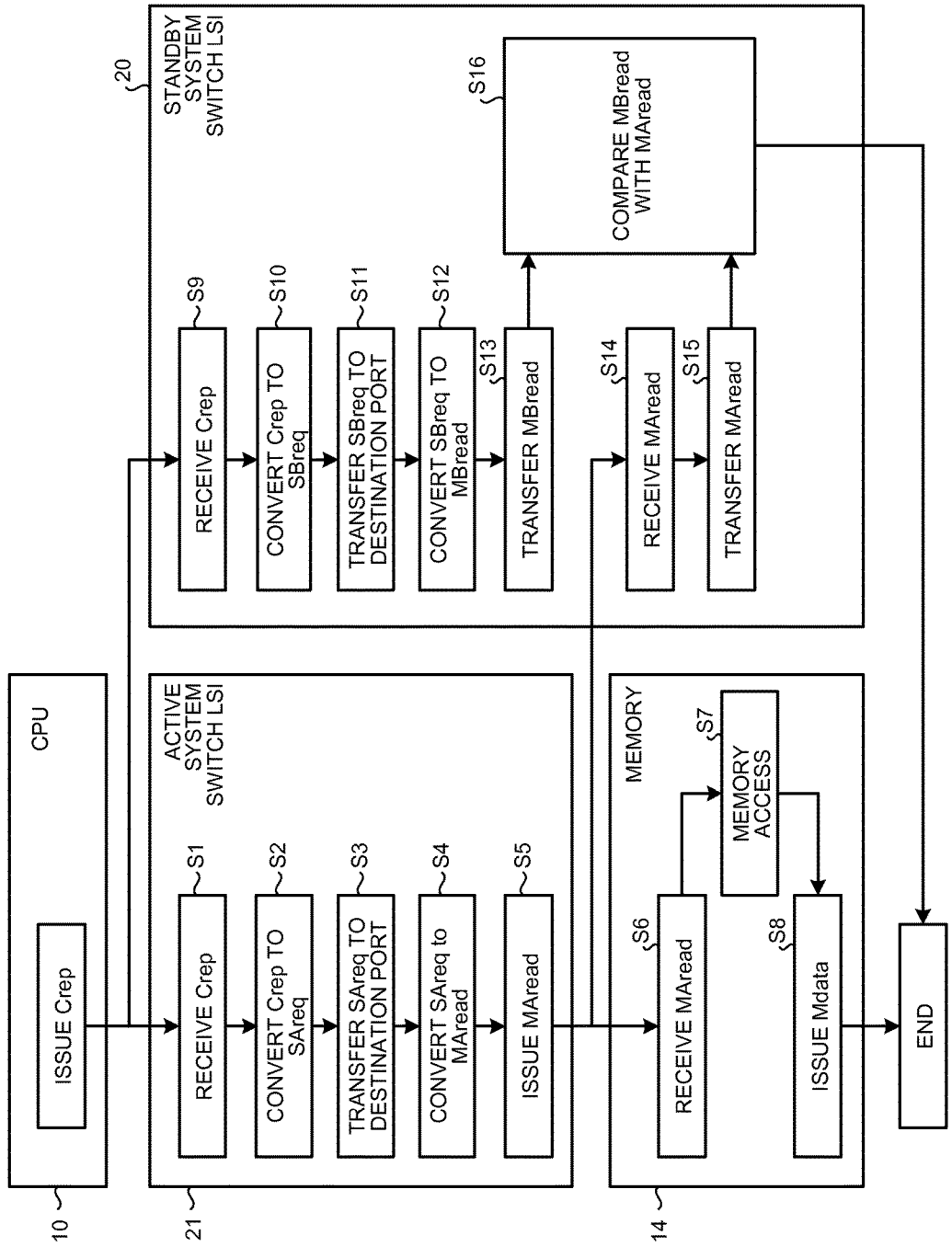
FIG. 8 is a first flowchart illustrating the flow of a process performed by each switch LSI.
Figure 9:
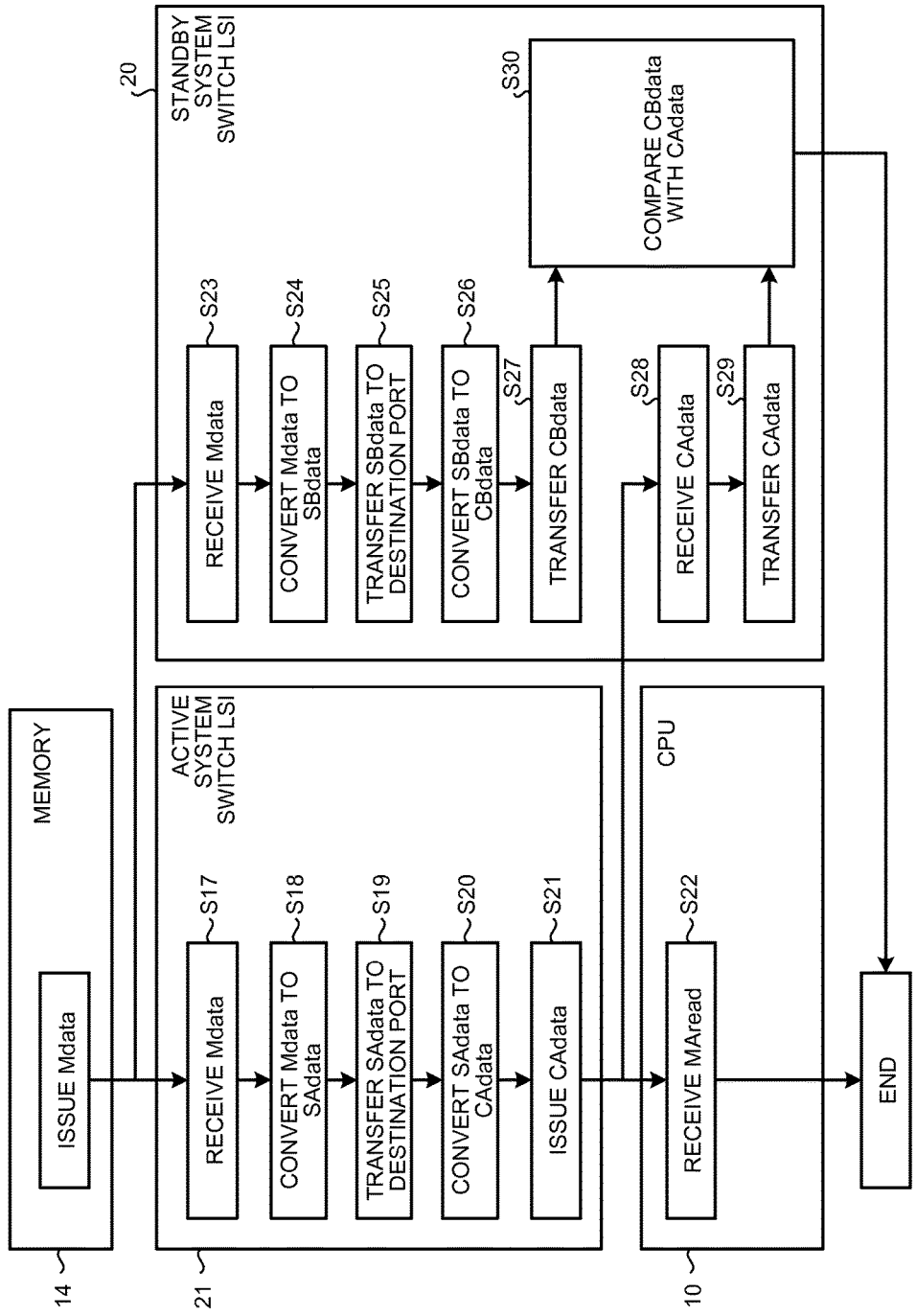
FIG. 9 is a second flowchart illustrating the flow of a process performed by each switch LSI.

In the following, the flow of a process performed by the active system switch LSI 21 and the standby system switch LSI 20 when the CPU 10 issues a request will be described with reference to FIGS. 8 and 9. FIG. 8 is a first flowchart illustrating the flow of a process performed by each switch LSI. FIG. 9 is a second flowchart illustrating the flow of a process performed by each switch LSI.

For example, the active system switch LSI 21 and the standby system switch LSI 20 start a process, as a trigger, when the CPU 10 issues "Creq". First, when the active system switch LSI 21 receives "Creq" (Step S1), the active system switch LSI 21 converts "Creq" to "SAreq" (Step S2) and transfers "SAreq" to the destination port (Step S3).

Then, the switch LSI 21 converts "SAreq" to "MAread" (Step S4) and issues "MAread" to the memory 14 (Step S5). Then, the memory 14 receives "MAread" (Step S6) and performs a memory access (Step S7). Thereafter, the memory 14 issues the read "Mdata" (Step S8) and then ends the process.

In contrast, the standby system switch LSI 20 receives "Creq" by snooping the bus (Step S9). Then, the switch LSI 20 converts "Creq" to "SBreq" (Step S10) and transfer "SBreq" to the destination port (Step S11). Then, the switch LSI 20 converts "SBreq" to "MBread" (Step S12) and transfers "MBread" to the data matching unit 42 (Step S1).

Furthermore, the switch LSI 20 receives, by snooping the bus, "MAread" issued by the switch LSI 21 (Step S14) and transfers "MAread" to the data matching unit 42 (Step S15). Then, the switch LSI 20 compares "MBread" with "MAread" (Step S16).

In the following, the subsequent process will be described with reference to FIG. 9. First, when the memory 14 issues "Mdata", the active system switch LSI 21 receives "Mdata" (Step S17), converts "Mdata" to "SAdata" (Step S18), and transfers "SAdata" to the destination port (Step S19). Furthermore, the switch LSI 21 converts "SAdata" to "CAdata" (Step S20) and issues "CAdata" (Step S21). Then, the CPU 10 receives "MARead" (Step S22) and ends the process.

In contrast, the standby system switch LSI 20 receives "Mdata" by snooping the bus (Step S23) and converts "Mdata" to "SBdata" (Step S24) and transfers "SBdata" to the destination port (Step S25). Then, the switch LSI 20 converts "SBdata" to "CBdata" Step S26) and transfers "CBdata" to the data matching unit 42 (Step S27).

Furthermore, by snooping the bus, the switch LSI 20 receives "CAdata" that is issued by the switch LSI 21 (Step S28) and transfers the received "CAdata" to the data matching unit 42 (Step S29). Then, the switch LSI 20 compares "CBdata" with "CAdata" (Step S30) and ends the process.

Figure 10:
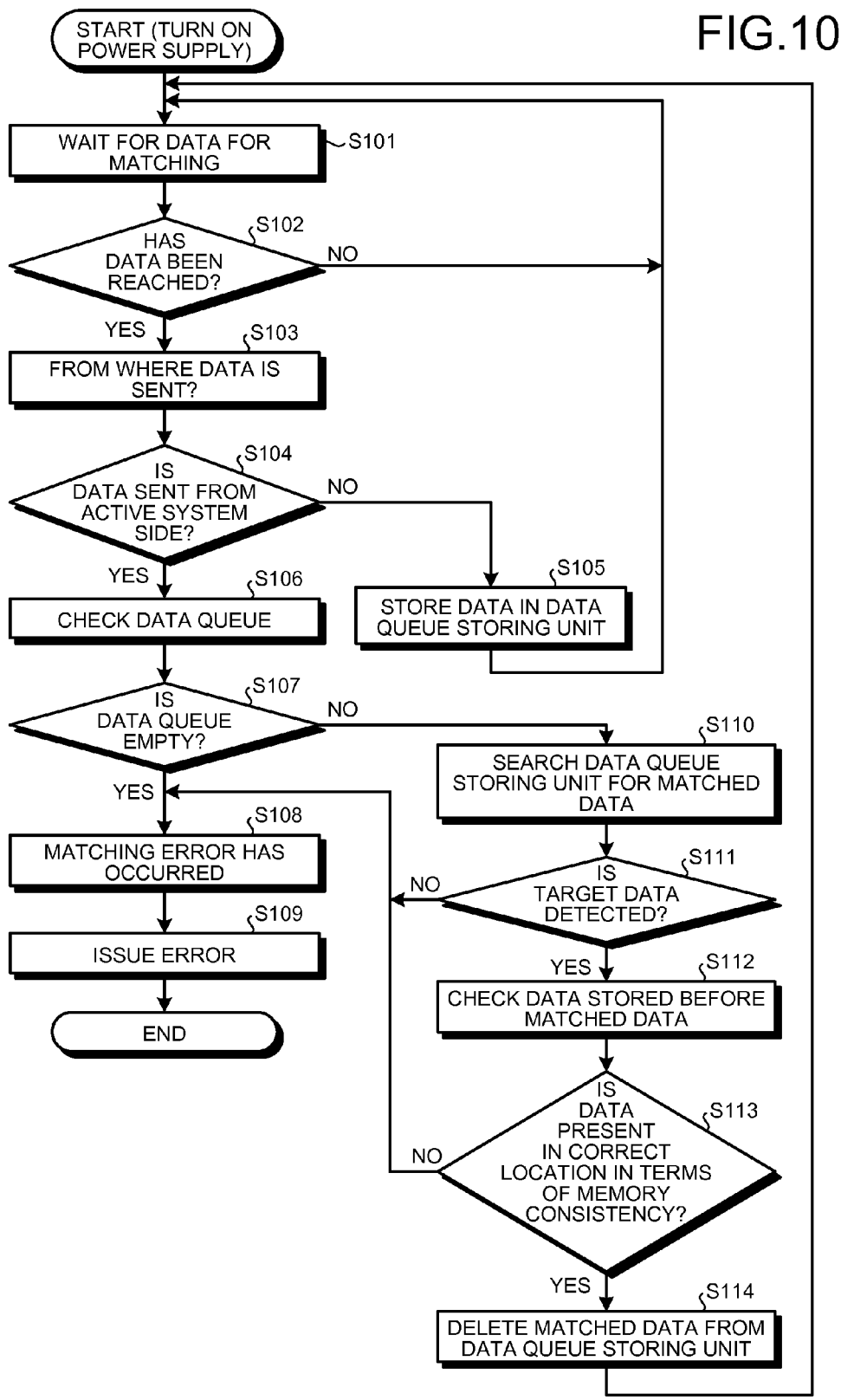
FIG. 10 is a flowchart illustrating the flow of a process performed by a data matching unit according to the first embodiment.
Figure 11:
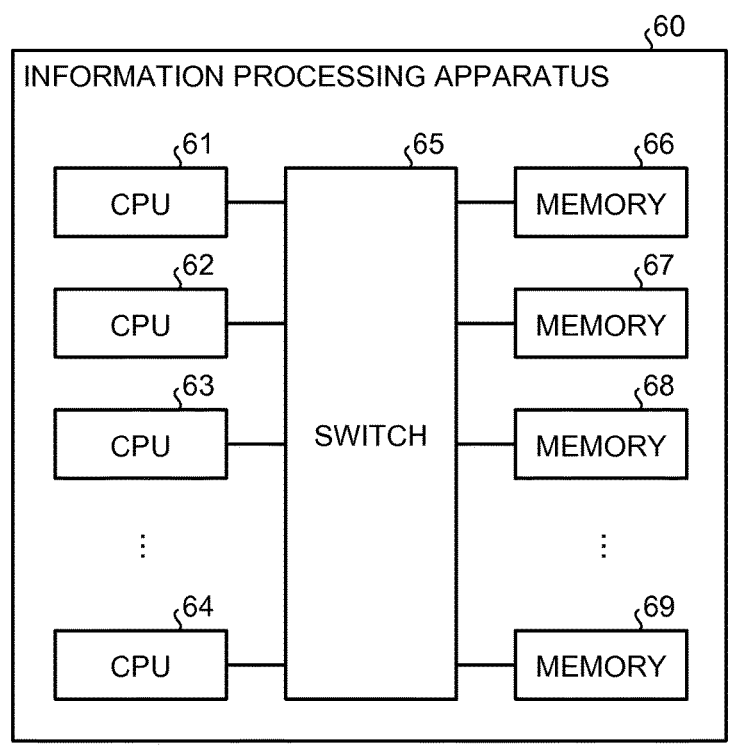
FIG. 11 is a schematic diagram illustrating an example of a switch that connects CPUs and memories.

In the following, the flow of a process performed by the data matching unit 42 will be described with reference to FIG. 10. FIG. 10 is a flowchart illustrating the flow of a process performed by a data matching unit according to the first embodiment. For example, the data matching unit 42 starts the process as a trigger when a power supply is turned on.

First, the data matching unit 42 waits for data that is used to perform the matching (Step S101). Then, the data matching unit 42 determines whether the data has been reached (Step S102). If the data has not been reached (No at Step S102), the data matching unit 42 performs the process at Step S101 again. In contrast, if the data has been reached (Yes at Step S102), the data matching unit 42 identifies whether the data has been sent from the active system switch LSI or from the standby system switch LSI (Step S103).

Then, the data matching unit 42 determines that the data is the data that has been sent from the active system switch LSI (Step S104). If the data is the data sent from the standby system switch LSI (No at Step S104), the data matching unit 42 performs the following process. Namely, the data matching unit 42 stores the data in the data queue storing unit 45 (Step S105) and performs the process at Step S101 again.

Furthermore, if the data matching unit 42 determines that the data is the data sent from the active system switch LSI (Yes at Step S104), the data matching unit 42 checks the data stored in the data queue storing unit 45 (Step S106). Then, the data matching unit 42 determines whether the data queue storing unit 45 is empty (Step S107). If the data queue storing unit 45 is empty (Yes at Step S107), the data matching unit 42 determines that a matching error has occurred (Step S108). Then, the data matching unit 42 issues an error indicating that the active system switch LSI has failed (Step S109) and ends the process.

In contrast, if the data queue storing unit 45 is not empty (No at Step S107), the data matching unit 42 searches the data queue storing unit 45 for data whose content does match (Step S110). Then, the data matching unit 42 determines whether data whose content does match is detected (Step S111). If the target data is detected (Yes at Step S111), the data matching unit 42 determines whether data that is stored before the matched data is stored is present (Step S112).

Furthermore, the data matching unit 42 determines whether the data detected at Step S111 is present in the correct location in terms of memory consistency (Step S113). If the data is present in the correct location in terms of memory consistency (Yes at Step S113), the data matching unit 42 deletes the matched data from the data queue storing unit 45 (Step S114) and returns to Step S101.

In contrast, if the data matching unit 42 does not detect the content that includes matched data from the data queue storing unit 45 (No at Step S111), the data matching unit 42 performs the process at Step S108. Furthermore, if the data detected at Step S111 is not present the correct location in terms of memory consistency (No at Step S113), the data matching unit 42 performs the process at Step S108.

Advantage of the First Embodiment

As described above, the information processing apparatus 1 includes the CPUs 10 to 13, the memories 14 to 17, the active system switch LSI 21, and the standby system switch LSI 20. At this point, the switch LSI 20 converts the memory access requests issued by the CPUs 10 to 13 to the memory access signals. Furthermore, the switch LSI 20 snoops the memory access signal that is output by the switch LSI 21. Then, if the content of the memory access indicated by the memory access signal that is converted by the switch LSI 20 itself does not match the content of the memory access indicated by the snooped memory access signal, the switch LSI 20 determines that the switch LSI 21 has failed.

Consequently, even if the switch LSI 21 fails, the information processing apparatus 1 can allow the switch LSI 20 to continue the process; therefore, the reliability of the information processing apparatus 1 can be improved. At this time, the information processing apparatus 1 can appropriately detect the timing at which the switch LSI 21 has failed and allows the switch LSI 20 to continue the process.

Furthermore, instead of comparing the waveforms of memory access signals, the switch LSI 20 compares the contents of memory accesses indicated by memory access signals. For example, the switch LSI 20 determines whether the memory addresses targeted for a memory access or the port numbers of the ports through which a memory access signal is output do match. Consequently, the information processing apparatus 1 does not need to make the operation clock of the switch LSI 20 and the switch LSI 21 the same and thus can improve the degree of freedom of the operation performed in the switch LSI 20 and the switch LSI 21. Furthermore, by using the highly functional switch LSI 20, the information processing apparatus 1 can multiplex the switches that connect between the CPUs 10 to 13 and the memories 14 to 17.

Furthermore, the switch LSI 20 snoops data that is output by each of the memories 14 to 17 and converts the snooped data to a reply signal. Furthermore, the switch LSI 20 snoops a reply signal that is output by the switch LSI 21. Then, the switch LSI 20 determines whether the content indicated by the reply signal converted by the switch LSI 20 matches the content indicated by the snooped reply signal. If the contents do not match, the switch LSI 20 determines that the switch LSI 21 has failed. Consequently, even if a function, from among the functions included in the switch LSI 21, of sending a reply to the CPU fails, the switch LSI 20 can also appropriately detect a failure.

Furthermore, also for reply signals, instead of the waveform of the reply signals, the switch LSI 20 determines, for example, the contents of the data sent by using the reply signals does match. Consequently, the information processing apparatus 1 does not need to make the operation clock of the switch LSI 20 and the switch LSI 21 the same and thus can improve the degree of freedom of the operation performed in the switch LSI 20 and the switch LSI 21.

Furthermore, if the memory that is the sending destination of the memory access signal converted by the switch LSI 20 is different from the memory that is the sending destination of the snooped memory access signal, the switch LSI 20 determines that the switch LSI 21 has failed. Specifically, the switch LSI 20 determines whether the port numbers of the destination ports of the memory access signals do match. Consequently, even if multiple combinations of the CPUs and the memories are present, the switch LSI 20 can appropriately detect a failure of the switch LSI 21.

Furthermore, the switch LSI 20 stores therein the memory access signal that is converted by the switch LSI 20 itself and determines whether the switch LSI 20 stores therein the memory access signal having the content that matches the snooped memory access signal. If the switch LSI 20 does not store therein the memory access signal having the content that matches the snooped memory access signal, the switch LSI 20 determines that the switch LSI 21 has failed. Consequently, even if, for example, the order the memory access requests were issued and the order the memory access signals are to be issued are inverted, the switch LSI 20 appropriately determines whether the switch LSI 21 fails.

Furthermore, the information processing apparatus 1 includes the control device 18 that disconnects the switch LSI 21 when the switch LSI 21 fails and that uses the switch LSI 20 as an active system. In this way, because the control device 18 can be implemented by a very small and simple logic in which the probability of a failure is small, the information processing apparatus 1 can further improve the reliability.

[b] Second Embodiment

In the above explanation, a description has been given of the embodiment according to the present invention; however, the embodiment is not limited thereto and can be implemented with various kinds of embodiments other than the embodiment described above. Therefore, another embodiment included in the present invention will be described as a second embodiment below.

(1) The Number of Devices of Switch LSI

In the above description, an example of the information processing apparatus 1 that includes the standby system switch LSI 20 and the active system switch LSI 21 has been described; however, the embodiment is not limited thereto. The switch LSI 20 may also be operated as an active system and the switch LSI 21 may also be operated as a standby system. Furthermore, the information processing apparatus 1 may also include a plurality of standby system switches.

For example, the information processing apparatus 1 includes the switch LSI 20 as an active system switch LSI and includes, as a standby system switch LSI, three or more pieces of switch LSI, such as the switch LSI 21, a switch LSI 21a, and a switch LSI 21b. Then, each piece of the standby system switch LSI 21 to 21b sends a failure detection result to the control device 18. Then, the control device 18 acquires the failure detection result obtained by each piece of the switch LSI 21 to 21b, which are standby systems, and determines, by using the majority logic, whether the active system switch LSI 20 has failed.

For example, if the control device 18 receives a notification from each piece of the switch LSI 21 and the switch LSI 21a indicating that the switch LSI 20 has failed, the control device 18 determines that the switch LSI 20 has failed. Then, the control device 18 uses one of the switch LSI 21 and the switch LSI 21a that has determined that the switch LSI 20 failed as an active system switch LSI and disconnects the switch LSI 20.

(2) Signal to be Snooped

The switch LSI 20 described above acquires, by snooping the bus, a memory access request or a reply signal that is sent and received between the CPU 10 and the switch LSI 21. Furthermore, the switch LSI 20 acquires, by snooping the bus, a memory access signal or data that is sent and received between the memory 14 and the switch LSI 21. However, the embodiment is not limited thereto.

For example, if a memory access request or the like is sent and received, in a packet, between the CPU 10 and the switch LSI 21 and between the switch LSI 21 and the memory 14, the switch LSI 20 may also receive a packet to be sent to the switch LSI 21 without discarding the packet. The switch LSI 20 may also snoop or acquire a signal that is sent and received by an active system switch LSI by using another arbitrary method.

(3) Comparison Target

When the data matching unit 42 described above compares the contents of the memory access signals, the data matching unit 42 compares the memory addresses that are targeted for a memory access, the port numbers of the ports connected to a memory that is the sending destination of a memory access signal, or the like; however, the embodiment is not limited thereto. The data matching unit 42 may also compare arbitrary contents that can be acquired from a memory access signal. Furthermore, when the data matching unit 42 compares the contents of reply signals, the data matching unit 42 compares data included in the reply signals, the port numbers of the ports connected to a CPU that is the sending destination of a reply signal; however, the data matching unit 42 may also compare an arbitrary content that can be acquired from a reply signal.

(4) CPUs and Memories Included in the Information Processing Apparatus

The information processing apparatus 1 described above includes the four CPUs 10 to 13 and the four memories 14 to 17; however, the embodiment is not limited thereto. Namely, the information processing apparatus 1 may also include an arbitrary number of CPUs and memories. Furthermore, the information processing apparatus 1 does not need to include the same number of CPUs and memories. The information processing apparatus 1 may also include memories the number of which is greater than that of CPUs.

(5) Data Matching Unit 42

The process performed by the data matching unit 42 may also be implemented by executing a program prepared in advance. The program may be distributed via a network, such as the Internet or the like. Furthermore, the program is stored in a computer readable recording medium, such as a hard disk, a flexible disk (FD), a compact disc read only memory (CD-ROM), a magneto optical disc (MO), or the like.

According to an aspect of an embodiment of the present invention, the reliability of the information processing apparatus can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a storage device that outputs stored data in accordance with a memory access request that is received;
a processor coupled to the storage device and the processor configured to perform an arithmetic operation on the stored data that is output by the storage device;
a first switch that includes a first port control circuit that converts a first memory access request to a first memory access signal, the first memory access signal converted by the first port control circuit being sent to the storage device; and
a second switch that includes a second port control circuit that converts a second memory access request to a second memory access signal, the second switch acquires the first memory access signal that is sent to the storage device, compares a memory address and a port number of a port connected to the storage device that are targeted for a first memory access performed by using the first memory access signal converted by the first port control circuit with a memory address and a port number of a port connected to the storage device that are targeted for a second memory access performed by using the second memory access signal, and determines, when the memory address and the port number targeted for the first memory access and the memory address and the port number targeted for the second memory access performed by using the first memory access signal and the second memory access signal do not match, that the first switch has failed.

2. The information processing apparatus according to claim 1, wherein
the first switch further includes:
a third port control circuit that converts data read from the storage device to a first response signal that is sent to the processor,
wherein the first switch sends the first response signal converted by the third port control circuit to the processor,
the second switch further includes
a fourth port control circuit that converts data read from the storage device to a second response signal,
wherein the second switch acquires the first response signal that is sent by the first switch to the processor, and
the second switch further compares content of a first reply performed by using the second response signal converted by the fourth port control circuit with content of a second reply performed by using the first response signal and determines, when the content of the first reply and the content of the second reply do not match, that the first switch has failed.

3. The information processing apparatus according to claim 2, wherein, when content of data that is processed by using the first response signal converted by the fourth port control circuit does not match content of data that is processed by using the first response signal, the second switch determines that the first switch has failed.

4. The information processing apparatus according to claim 1, wherein
the information processing apparatus includes
a plurality of processors including the processor, and
a plurality of storage devices including the storage device, and
when a first storage device that is a sending destination of the first memory access signal converted by the first port control circuit does not match a second storage device that is a sending destination of the second memory access signal, the second switch determines that the first switch has failed.

5. The information processing apparatus according to claim 4, wherein the second switch stores therein the memory address and the port number targeted for the second memory access signal converted by the second port control circuit, identifies the memory address and the port number targeted for the first memory access performed by using the first memory access signal that is converted by the second port control circuit, deletes, when the second switch stores therein the memory address and the port number that matches the identified memory address and the port number, the memory address and the port number, and determines, when the second switch determines that the first switch does not fail and when the second switch does not store therein the memory address and the port number that matches the identified memory address and the port number, the second switch determines that the first switch has failed.

6. The information processing apparatus according to claim 1, further comprising a control device that disconnects the first switch when the second switch determines that the first switch has failed.

7. The information processing apparatus according to claim 1, further comprising:
a first bus that connects the first switch the second switch, and the processor, and
a second bus that connects the first switch, the second switch, and the storage device, wherein
the second switch snoops, via the first bus, the first memory access request and snoops, via the second bus, the first memory access signal sent by the first switch.

8. A switch failure detection method for detecting failure of an apparatus that includes a storage device that outputs stored data in accordance with a memory access request that is received, a first switch that is connected to the storage device, and a second switch that is connected to the storage device, the switch failure detection method comprising:
converting, by a first port control circuit included in the first switch, a first memory access request to a first memory access signal;
sending, by the first switch, the first memory access signal converted by the first port control circuit to the storage device;
converting, by a second port control circuit included in the second switch, a second memory access request to a second memory access signal;
acquiring, by the second switch, the first memory access signal sent by the first switch to the storage device; and
comparing, by the second switch, a memory address and a port number of a port connected to the storage device that are targeted for a first memory access performed by using the first memory access signal converted by the first port control circuit with a memory address and a port number of a port connected to the storage device that are targeted for a second memory access performed by using the second memory access signal and determining, when the memory address and the port number targeted for the first memory access and the memory address and the port number targeted for the second memory access performed by using the first memory access signal and the second memory access signal, respectively, do not match, that the first switch has failed.

* * * * *